United States Patent [19]

Koslow et al.

[11] 4,380,886

[45] * Apr. 26, 1983

[54] METHOD OF PROMOTING WATER TRANSPORT THROUGH SOIL

[75] Inventors: Evan E. Koslow, Westport, Conn.; J. Samuel Batchelder, Pasadena, Calif.

[73] Assignee: Koslow Technologies, Inc., Westport, Conn.

[*] Notice: The portion of the term of this patent subsequent to Aug. 7, 1996, has been disclaimed.

[21] Appl. No.: 229,938

[22] Filed: Jan. 30, 1981

Related U.S. Application Data

[62] Division of Ser. No. 147,911, May 8, 1980.

[51] Int. Cl.³ .............................................. C09K 17/00
[52] U.S. Cl. .................... 47/58; 47/DIG. 10; 405/36; 405/264; 71/27; 71/903
[58] Field of Search .................. 405/36, 264; 47/58, 47/DIG. 10; 71/1, 27, 64.8, 64.1, 903

[56] References Cited

U.S. PATENT DOCUMENTS 4,163,657  8/1979  Koslow et al. .................. 71/903

FOREIGN PATENT DOCUMENTS 47-2528  1/1972  Japan .

Primary Examiner—S. Leon Bashore
Assistant Examiner—Ferris H. Lander
Attorney, Agent, or Firm—James & Franklin

[57] ABSTRACT

A method of promoting the transport of water through medium and coarse grained soils comprising the step of applying to the medium or coarse grained soil a soil amendment composition at a level of less than 20 parts per million parts by weight of dry soil, and preferably less than 5 ppm. The composition comprises a substantially linear, substantially water-soluble hydrophilic polymer having a molecular weight greater than 50,000. A preferred polymer is poly (ethylene oxide) having a molecular weight of 300,000 to 7,000,000.

16 Claims, 5 Drawing Figures

METHOD OF PROMOTING WATER TRANSPORT THROUGH SOIL

This is a division of application Ser. No. 147,911, filed May 8, 1980.

BACKGROUND OF THE INVENTION

The present invention relates to a method of promoting the transport of water through medium and coarse grained soils.

Soil particles contain a large number of small channels or capillaries through which water is capable of flowing, and may be graded on the basis of the capillary or pore diameters. As water is made to flow through a channel, whether that channel be a soil pore or not, the rate of capillary water flow through the channel will be higher if the water is capable of wetting the channel surface. At the interface of the water and the capillary surface, however, there exists a long range van der Waal interaction between the water and the capillary surface. While the van der Waals interaction typically extends less than 200 angstroms into the body of water, it nonetheless decreases the ability of the water to wet the capillary surface, thereby increasing the contact angle between the water and the capillary surface and hindering the flow of water therethrough. While the negative effect of the van der Waals interaction may be negligible in the case of water flowing through a household pipe, when one considers the flow of water through minute soil pores, this interaction has a major effect.

It is well known that certain water-soluble polymers, when placed within a soil environment, dramatically alter the flow of moisture through the soil and increase water retention. Among the water-soluble polymers utilizable for this purpose are high molecular weight poly (ethylene oxide), polyvinyl alcohol, polyvinyl pyrrolidone and polyacrylamide (whether hydrolyzed or not). The use of these polymers is suggested in such patents as U.S. Pat. Nos. 3,633,310; 3,798,838; 3,909,228; and Japanese Pat. No. 47-2528 (1972). U.S. Pat. No. 4,163,657 describes a soil conditioning composition (preferably a substituted poly (ethylene oxide)) having enhanced retention time within the soil. It will be appreciated that these linear, water-soluble, hydrophilic polymers directly control the physical properties of the soil water by modifying, e.g., its viscosity, surface tension, and contact angle, and hence act in an entirely different manner than the cross-linked, water-insoluble hydrophilic "super-slurper" polymers or polymers used to aggregate soil particles. The aforementioned Japanese patent teaches that the poly (ethylene oxide) should have a molecular weight of 300,000 to 5,000,000 and should be applied at 50–500 parts per million by weight of dry soil. The aforementioned U.S. Pat. No. 4,163,657 teaches that the polymer must have a molecular weight greater than 50,000 and is to be used at a level of 5–2500 parts per million parts by weight of dry soil. The patent further provides that, within the ranges specified, the amount of polymer to be used would be dependent upon a marginal cost analysis involving the price of the polymer and the increment in the value of the crop produced through its use. Thus, the patent teaches that "more is better", at least until, at the high end of the range, the marginal cost of the extra quantity of polymer is not offset by the marginal increment in market value of the additional crop produced through use of the extra quantity of polymer.

Despite the suitability of the soil conditioning composition of U.S. Pat. No. 4,163,657 for its intended use in its recommended quantities, there remains a need for a composition capable of enhancing the transport of water at only a fraction of the cost.

It is an object of the present invention to provide a method of promoting the transport of water through medium and coarse grained soils by the use of economical quantities of a soil amendment.

It is a further object of the present invention to provide such a process where the soil amendment is also a composition characterized by a low washout rate from soil, thereby rendering the composition even more cost-effective.

SUMMARY OF THE INVENTION

It has now been found that, partially within the broad range of 5–2500 ppm and the preferred range of 5–500 ppm taught by U.S. Pat. No. 4,163,657, there is for a particular one of the many polymers referenced therein a partially overlapping range of 0.05–20 ppm within which there exists a soil amendment level affording enhanced water transport through medium and coarse grained soils, with the result that equal or superior water transport enhancement is achieved at only a miniscule fraction of the cost.

More particularly, it has been found that as the quantity of composition utilized is incremented from the low part of the range provided for in the present invention to the high part of the range provided for in the present invention, the water transport rate (as reflected in the percentage yield increase over a control) rapidly builds to a peak and then rapidly decreases. Viewed another way, the percentage yield increase per pound of polymer used sharply increases, peaks and then sharply decreases, all within the range provided for in the present invention. While the increase in water transport (relative to a control) resulting from use of the composition of the present invention at quantities much higher than those taught by the present invention may even exceed the absolute increase produced by use at the peak level within the range provided for in the present invention, clearly the percent increase per pound of polymer or per dollar spent for polymer will be much less. For example, even if equal enhancement of water transport is achieved at a 250 pound per acre application level (pursuant to the prior art) as at a 10 pound per acre application level (pursuant to the teaching of the present invention), the farmer obtains the same advantage at only a fraction (10/250) of the cost, about 4%. There are, of course, additional economic advantages to the farmer in that his capital investment is lower, and he need purchase, transport, store, and apply only a fraction of the amount of the chemical.

This phenomenon is unique to substituted or unsubstituted polymers of ethylene oxide having a molecular weight greater than 50,000, and preferably in the 300,000 to 7,000,000 range, the polymer being present in the soil at a level of at least 0.05 ppm of dry soil but less than 20 ppm and preferably less than 5 ppm.

DETAILED DESCRIPTION OF THE PREFERRED EMBODIMENTS

Figure 1:
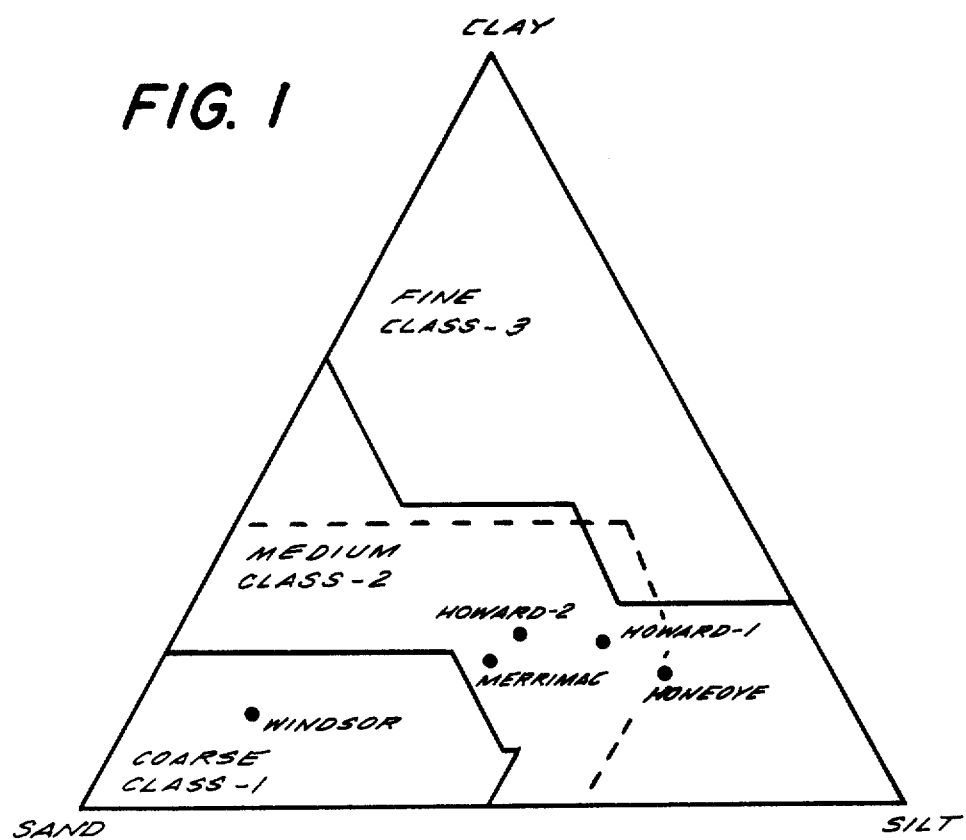
FIG. 1 is a triangular diagram of soil composition texture having superimposed thereon in dashed line an indication of the region of polymer effectiveness.

The soil conditioning composition of the present invention comprises essentially a substantially linear, substantially water soluble, hydrophilic polymer having a molecular weight greater than 50,000. The polymer need not be completely linear as small amounts of branching which do not deleteriously affect the substantial water-solubility of the polymer are acceptable.

The only polymers useful in the process of the present invention are the polymers of ethylene oxide—namely, the homopolymers of ethylene oxide (that is, poly (ethylene oxide)—commonly called PEO) and the copolymers of ethylene oxide with minor amounts of one or more comonomers. The preferred comonomers are those whose homopolymers are already recognized as useful in conditioning soil and increasing the water retention thereof and flow therethrough—for example, vinyl alcohol, vinylpyrrolidone, vinyl acetate, acrylic acid, oxyethylene lauryl ether, oxyethylene sorbitan mono-oleate, and acrylamide.

PEO not only imparts a maximum benefit to the soil using the smallest mass of material, but has a very low intrinsic mammalian toxicity and is readily available. Suitable comonomers also include those described hereinbelow as substituted comonomers. Preferably the total weight of comonomers (including substituted and non-substituted comonomers) does not exceed 5% by weight of the copolymer and the presence of the comonomer or comonomers does not interfere with the achievement of significant lengths of pure PEO chains.

The polymers useful in the present invention are believed to be water-template-forming polymers, in the sense that, when placed in a highly polar solvent such as water, they promote the formation of ice-like structures of water surrounding the polymer molecule. (For a further understanding of this theoretical requirement, see the theoretical explanation of the efficacy of the invention below). Various chemicals, including some high molecular weight water-soluble linear macromolecules and nonionic surfactants, have been tested for utility in the process of the present invention. These tests have shown these polymers and surfactants to be ineffective, presumably because they have insufficient molecular weight, excessive binding (adsorption) capacity on soils, or inappropriate molecular structure. Without the high molecular weight, the chemical must be applied at very high concentrations because a majority of the chemical penetrates and is lost in small capillaries within the soil that do not substantially contribute toward water transport. Other problems occur when the chemical becomes strongly attached to the surface of the soil matrix and can not extend into the aqueous phase. The result in this case is that the polymer quickly attaches to the soil but does not modify the long-range van der Waals interaction occurring in the fluid. Finally, many macromolecules are ineffectual template polymers with large portions of the molecule interfering with the establishment of "ice-like water structures". These polymers do not have the capacity to effectively influence the soil-water transport situation and have proved ineffective as soil amendments in the process of the present invention.

In order to prevent rapid wash-out of the polymer from the soil, it is preferred that the polymer have at least one functional group disposed along the polymer chain. To this end the polymer may be formed by appropriately substituting any of the polymers described above or copolymerizing the ethylene oxide monomer with one or more substituted comonomers (that is, comonomers containing the functional group) such as epichlorohydrin.

The preferred functional groups are the amines, amides, quaternary ammonium salts, sulfides, bisulfides, halides, cyanides and phosphates. Based on experiments performed to date, halides are especially preferred. As the purpose of the functional group is to provide the polymer with a portion adapted to secure the polymer to an immobile solid soil phase, and there are a variety of different mechanisms which may be operating individually or jointly to bind the functional group to the solid soil phase, the aforementioned listing of functional groups should not be considered exhaustive. Among the mechanisms which may be operative in a given case are hydrogen bonding (promoted by the presence of highly polar groups or charge transfer groups at the binding sites), ligand exchange, ion exchange, chemisorption (involving actual chemical reaction between the polymer and the solid soil phase), short range van der Waals bonding (promoted by increasing molecular weight of the polymer), and London interactions. The London interactions are often called "hydrophobic bonding", and are promoted in aqueous systems with polymers having hydrophobic moieties such as long-chain saturated or unsaturated carbons, aromatics, etc., which interact with the hydrophobic organic matter present in the solid soil phase.

Thus the functional groups are typically hydrophobic groups, chemically reactive groups, highly polar groups or highly cationic groups (such as quaternary ammonium salts). A more complete exposition of the solid soil phase bonding mechanisms is found in "Organic Chemicals in the Soil Environment", Vol. 1, C. A. I. Goring and J. W. Hamaker, editors (Marcel Dekker Inc., New York 1972).

In order to reduce polymer wash-out, the polymer chain must comprise one or more polymer chain segments characterized by an absence of the functional groups therein and a minimum length. Where the polymer chain segment is secured at only one of the ends thereof to one of the functional groups (with the other end thereof typically defining the end of the polyme chain), the minimum length is 0.1 micrometer. In this instance the functional group (which ordinarily, but not necessarily, would be at one end of the polymer chain) serves to anchor the polymer chain to the solid soil phase, with the polymer chain segment being free to enter into the aqueous phase. When the polymer chain segment is secured at each end thereof by a respective one of the functional groups, the minimum length is at least 0.2 micrometer. In this instance, the two functional groups secured to the polymer chain segment ends attach the ends to the solid soil phase and therefore the polymer chain segment must be twice the length described in the case of the polymer chain segment secured to a functional group adjacent only one end thereof, in order to enable the polymer chain segment to extend equally as far into the aqueous soil phase. Obviously a given polymer chain may include a mix of polymer chain segments comprised of one or more of the first type of polymer chain segments and/or one or more of the second type of polymer chain segments. In a preferred case, the polymer chain will have the functional groups disposed at one or both of the ends thereof. In this case, if there is only one functional group, then the polymer chain segment is of the first type; if there are two functional groups (one at either end of the polymer chain), then the polymer chain segment is of the second type.

It will be appreciated that functional groups may also be disposed immediately adjacent one another (e.g., as part of a block polymer) or separated by less than a 0.1 micrometer length of polymer chain; however, in the latter case, the portion of the polymer chain intermediate the two functional groups does not qualify as a polymer chain segment according to the present invention as it is incapable of extending sufficiently into the aqueous soil phase to enhance water transport. Thus, the purpose of the spacing of the functional groups along the polymer chain is to insure that there is at least one portion of the polymer (namely, the functional group) adapted to secure the polymer to the solid soil phase and at least one portion (the part of the polymer chain intermediate a pair of functional groups or intermediate one functional group and a chain end) adapted to extend into the aqueous soil phase. The desired length of the polymer chain segment is determined by such considerations as the size of the soil pores onto which it will extend and, more particularly, the size of the soil pores which must be acted on to provide the enhanced water transport.

Preferably each polymer chain segment has a length of about 50–250 micrometers, although even longer polymer chain segments are useful as well.

The substituted polymers of the present invention may be synthesized by techniques well recognized by those skilled in the art. For example, poly(ethylene oxide) substituted with chlorine may be produced by dissolving poly(ethylene oxide) homopolymer in pyridine and reacting the solution with phosphorus trichloride ($PCl_3$). The resulting product is dried, dissolved in distilled water, filtered through qualitative filter paper, and extracted in chloroform. The extract is then dried and optionally redissolved in distilled water. The resulting product contains about 3% of the substituted polymer (i.e., poly(ethylene oxide) with one or two chlorine end groups), the remainder being unsubstituted polymer (i.e., poly(ethylene oxide)).

A preferred copolymer of the present invention may be formed by reacting a block polymer of epichlorohydrin with an ethylene epoxide to grow the long chain water-soluble polymer. The chloride groups of the block polymer are then further reacted (for example, with ammonia, alcohol, hydrogen cyanide, etc.) to yield the specific bonding site of choice (for example, amines, alkyl groups, or cyanides). It will be appreciated that the choice of comonomers will be influenced by the need to maintain the resultant polymer water-soluble.

While the presence or absence of the functional group on the polymer chain primarily affects the washout rate of the polymer, it is a critical feature of the present invention that the polymer be present in the soil at a level of less than 20 parts by weight and preferably less than 5 parts, per million parts of dry soil. (As one part of polymer per million parts of dry soil corresponds to about 2 pounds of polymer per acre of dry soil, the present invention only uses less than 40 pounds of polymer per acre of dry soil, and preferably less than 10 pounds per acre.) The ratio of polymer to soil is based on the weight of the soil after saturation to field capacity and draining. A polymer level of less than 0.05 ppm would be expected to give little, if any, improvement in water transport and hence represents a preferred minimum polymer level.

In actual use the soil amendment composition will be applied to the soil in suitable quantities to provide a polymer level in the soil at or about the peak, preferably at or slightly below that level. In order to determine the optimal application rate of the polymer, it is only necessary to determine the standard agronomic crop response function for the particular polymer being used in the particular soil. For example, a number of test lots may be prepared, and each treated with a different application level of polymer ranging from 0.05 to 20 ppm. The corresponding yield for each application gives the crop response function. The optimal application level will be indicated by a well defined peak reflecting the highest yield at the lowest application level.

While it is only required that the polymer have a molecular weight greater than 50,000 for the purposes of the present invention, molecular weights of 300,000 to 7,000,000 are preferred. The higher molecular weights minimize uptake of the polymer by the smaller soil pores and thus allow the polymer to concentrate in the medium and larger size soil pores which transport the bulk of the water and where the polymer can thus operate most efficiently to improve the total water transport rate.

Referring now to FIG. 1, the composition of soil may be represented by points within a triangle, the apices of which represent clay, sand and silt, respectively. As illustrated by the solid black lines, soil may be characterized by one of the three texture classifications used by the U.N. Food and Agricultural Organization: Class-1 (coarse grained soil), Class-2 (medium grained soil), and Class-3 (fine grained soil). Thus while pure fine sand which has an internal pore diameter of about $10^{-2}$ cms would be considered a coarse grained soil and pure clay which has an internal pore diameter of about $10^{-4}$ cms would be considered a fine grained soil, certain mixtures of clay and sand, along or in combination with silt, may be considered a medium grained soil. As a practical matter, soils are graded as being fine, medium or course-grained not on the basis of particle size or pore size, but rather on the more empirical basis of how fast they drain water. In addition to the solid black lines defining the classes of soil, there is a dash line delineating the region in which the polymer of the present invention is most useful, with the area below and to the left representing the region of maximum polymer effectiveness. In accordance with the present invention the polymer is not used with fine grained soils because the soil pores are too small. One reason for this is that large amounts of polymer would be required to provide the desired effect in all of the many small pores and the overall positive effect on water transport provided by that large amount of polymer in the small pores would have only a small effect on the total amount of water transported, due to the small volume of water transported by the small pores relative to the large volume transported by the medium and large pores. Indeed it is for this reason that the use of a polymer having a large molecular weight (300,000–7,000,000 units) is preferred, such polymer being unable to penetrate the small pores and therefor accumulating primarily in the medium and large pores.

While a theoretical explanation of the effect of the soil amendment on water transport is presented below, it should be appreciated that the present invention does not depend upon the theoretical explanation and the applicants do not restrict themselves to such theoretical explanation. Polymers of the type useful in the present invention are capable of modifying water transport by two entirely different mechanisms. One mechanism—hereinafter called "the bulk mechanism"—involves a modification of the properties of the bulk water flowing through the soil. In order to modify this large volume of water, considerable quantities of the polymer must be used, 5–500 or even 5–2500 parts of polymer per million parts of dry soil, as taught in the prior art. Where the bulk mechanism is operative, the "more is better" principle applies with greater levels of polymer producing enhanced water transport levels even past the point where the marginal cost of polymer used exceeds the marginal profit on extra yield. As the present invention does not concern itself with the use of polymer at the bulk mechanism level, further explanation of the activity of the polymer at this level is not deemed necessary. The second, and quite different mechanism is the "surface effect" or "film" mechanism. In order to obtain the "surface effect" mechanism, it is only necessary to modify the characteristics of the water at the interface of the water and the soil pore through which the water is passing; accordingly, much lower quantities of the polymer are required and one operates according to the "less is better" principle. In order to comprehend the "surface effect" mechanism it must be understood that a van der Waals barrier exists when water attempts to wet a surface, such as the interior surface of a soil pore. This metastable region of water film thickness produces a hindered flow of water in porous media for films of water less than roughly 200 angstroms. The polymers of the present invention have an unusual configuration such that, when placed in a highly polar solvent such as water, they promote the formation of ice-like structures of solvent surrounding the polymer molecule. This influence of the polymer upon the water produces a change in the dielectric constant of the water, thereby modifying the interaction of the water with the pore surface so as to break down the van der Waals barrier to wetting. Thus, water can flow through the pore without hinderance from the van der Waals interactions with the wall, the water wetting the pore surface even when the film thickness drops below 200 angstroms. Only small polymer levels are necessary to produce the desired surface effect, thus causing the sharp upside of the peak. At the same time as the polymer is causing the desired surface effect, however, it is also tending to increase the viscosity of the water and create various other effects which ultimately produce problems for water flow. Accordingly, once the polymer level increases beyond that needed to overcome the van der Waals interactions, additional increments of polymer have a negative effect on the flow rate of the water, thereby causing the sharp downside of the peak. At some point after the peak, a polymer increment activates the bulk mechanism sufficiently to partly overcome the negative effects of the increment and again increases the water flow rate, this time due to the bulk mechanism. As the "surface effect" and "bulk" mechanisms are entirely different, the ultimately possible level of enhancement in water flow rate caused by the "bulk" mechanism may be less than, equal to or greater than the maximum resulting from the "surface effect" mechanism. However, equal enhancement by means of the "bulk" mechanism is achieved only by the use of many times more polymer than is required to achieve the same enhancement level using the "surface effect" mechanism.

It will be appreciated that neither the "surface effect" nor "bulk" mechanisms are related to the well known characteristic mechanism of conventional wetting agents. The efficacy of the present invention is most noticeable where the thickness of the water films in the soil are 150 angstroms or less (corresponding to, in a typical soil, a bulk water content of approximately 12.5% by weight). At these film thicknesses all of the water passing through the soil pore is strongly affected by the van der Waals interaction. Thus, while the flow of water through the untreated soil becomes strongly hindered at or below the 12.5% water content level, but above some very low moisture content where the soil displays very strong adsorption of the pore water, polymer-treated soil retains an enhanced capacity to transmit water.

EXAMPLES

The following examples illustrate the efficacy of the present invention.

EXAMPLE I

A field site roughly 65 m long and 8 m wide, situated on Howard-1 Loam soil (a Class-2 medium-texture soil) was planted with Lanco soybeans. Seed was sown at 7.5 cm spacing in rows spaced 1 meter apart. Each row used in the test, usually those away from the outer edge of the site and separated from each other by a guard row, was split into nine 6.5 m sections and each section of the row was treated with a varying amount of 5,000,000 MW poly(ethylene oxide) by applying the PEO as dry powder to the surface of the soil to a distance 0.4 m on either side of the row. The polymer was applied at planting and the crop then allowed to develop and mature. Standard methods of cultivation and management of the crop were applied to provide nutrients and control weeds. The growth of the plants in each section was recorded when the plants matured and were harvested. Typically, five replicates for each concentration of polymer were distributed in a random fashion throughout the filed site.

Figure 2:
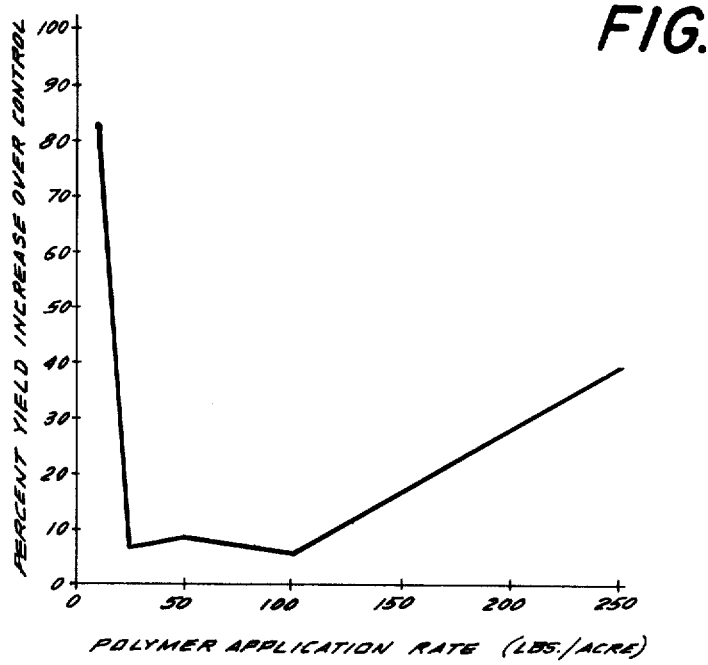
FIG. 2 is a graph showing the percentage yield increase over a control as a function of polymer application level.
Figure 3:
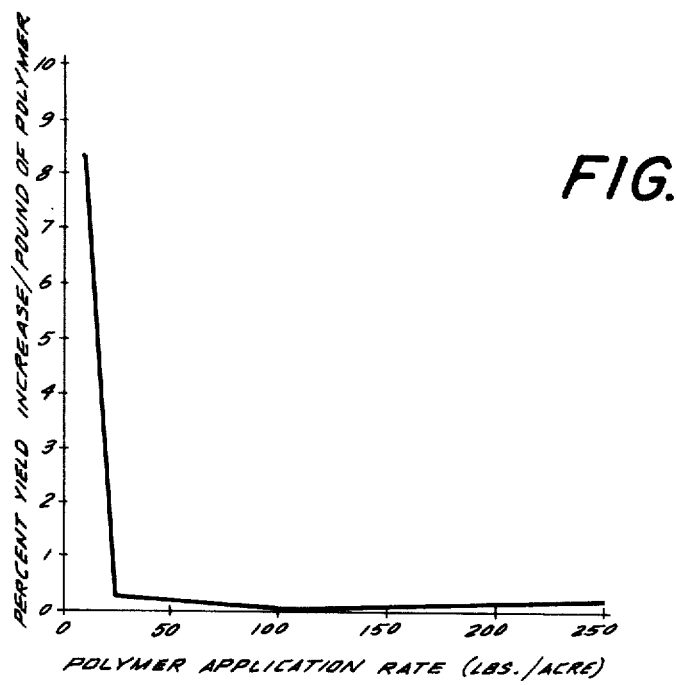
FIG. 3 is a graph showing the percentage yield increase per pound of polymer (over a control) as a function of polymer application level.

To eliminate variables such as climatic conditions the results are reported in FIG. 2 as a percentage increase in yield relative to a control (wherein no polymer is applied) as a function of polymer application rate. The results are also reported in FIG. 3 with the absicca here representing the percentage increase in yield per pound of polymer used to obtain that increase in yield. Comparing FIGS. 2 and 3 it is observed that while FIG. 2 shows a significant yield increase starting at application rates over 100 pounds/acre, FIG. 3 reveals the yield increase per pound of polymer used to be relatively constant in the "more is better" region. By way of contrast, in the "less is better" region which is the subject of the present invention even a small increase in the application rate over the optimum dramatically lowers both indicators of polymer efficiency, the percent yield increase over control and the percent yield increase (over control) per pound of polymer used.

Curves of substantially similar configuration are obtained on a variety of different crops planted in a variety of Class 1 and 2 (medium and coarse grained) soils using PEO polymers of varying molecular weights (300,000 to 7,000,000), although the actual figures obtained vary.

EXAMPLE II

Figure 4:
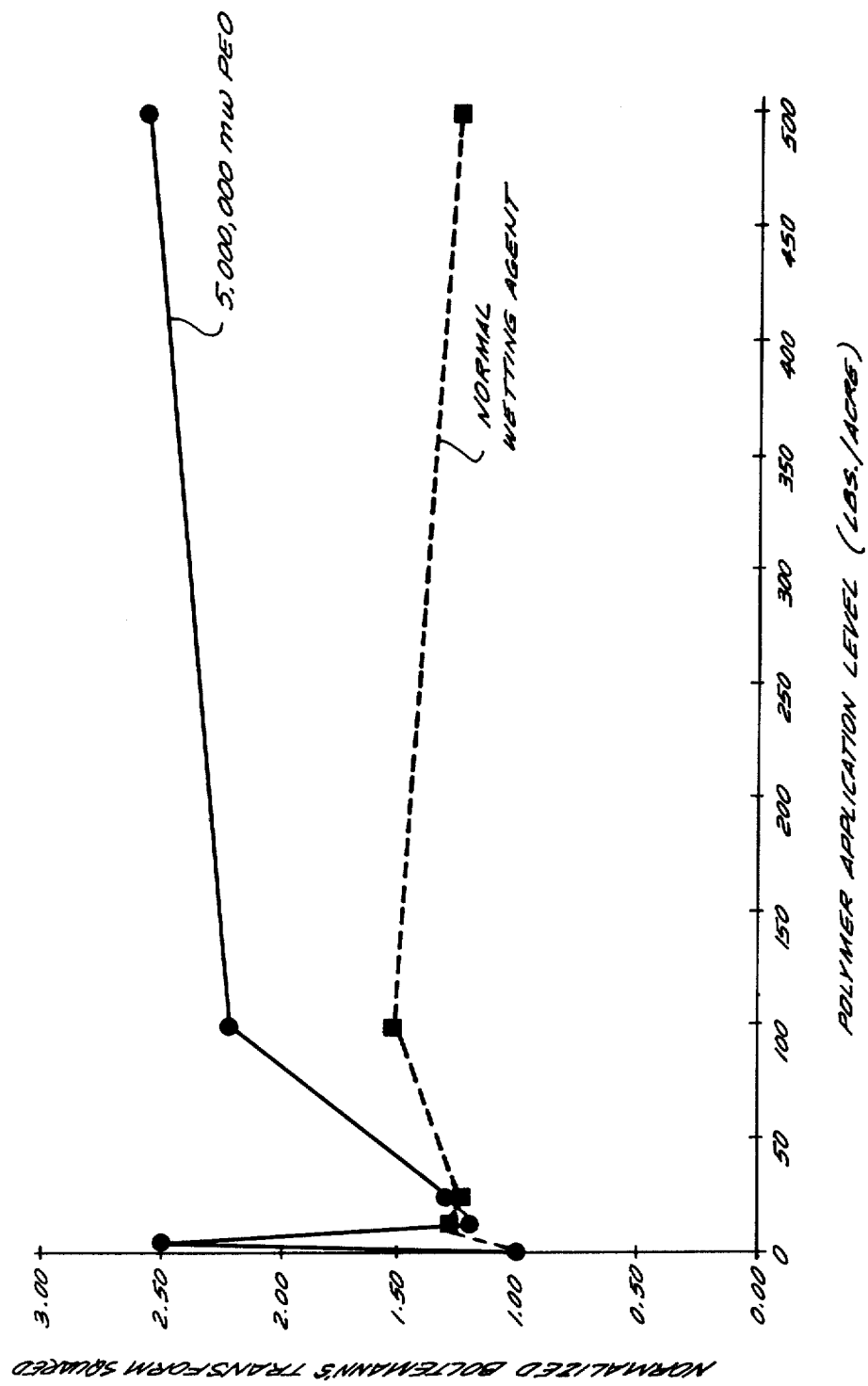
FIG. 4 is a graph showing the normalized Boltzman transform squared (representing flow rate) as a function of the polymer application level.

A 150 g. sample of Windsor sandy loam soil was saturated with 50 ml of a solution containing a known amount of 5,000,000 MW weight poly (ethylene oxide) and allowed to dry for approximate one week. When dry, the soil was taken and packed in a uniform manner in a cylindrical column roughly 3.6 cm in diameter to a standard bulk density (typically from 1.2–1.4 grams/cm$^3$ depending upon the nature of the sample). The sample had a moisture content of roughly 4–6% water as determined gravimetrically. The column of soil was then vertically held, and the tip of the sample was immersed in free water to allow water to enter the column via capillary action. The advance of the visible wetting front through the soil column is plotted against the square root of elapsed time to provide a straight line whose slope is the Boltzmann transform for water transport through the sample (Boltzmann's transform). Results are reported in FIG. 4 showing the Boltzmann transform squared and normalized against a control (wherein no polymer was used) as a function of polymer application rate (see solid circular data points). For comparative purposes FIG. 4 also shows the same data for a conventional wetting agent, low molecular weight alkylated PEO (see box data points).

EXAMPLE III

The procedure of Example I was repeated with minor variations, using sweet corn rather than Lanco soybeans.

Figure 5:
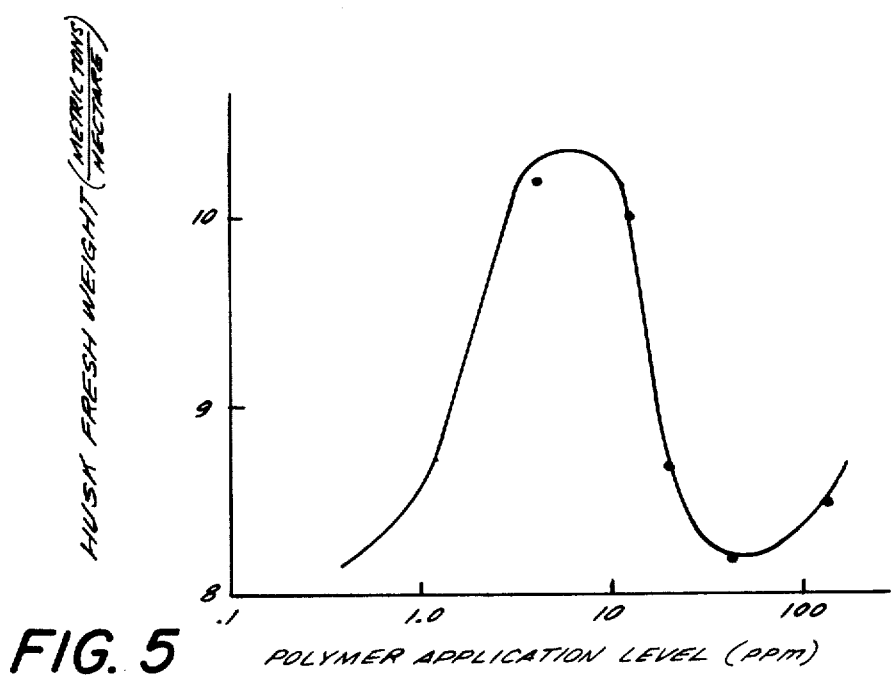
FIG. 5 is a semilog graph showing crop weight as a function of the polymer application level.

The weights of fresh husks grown per unit area (in metric tons per hectare) for various polymer application levels (ppm by weight of dry soil) were recorded. FIG. 5 shows the recorded points and a gaussian curve fit to the data points on a semilog graph to more clearly illustrate the distinct peak at low polymer application levels (in the surface effect or "less is better" region) and the onset of the bulk mechanism effect at higher polymer application levels (in the "more is better" region).

It should be appreciated that the method of the present invention is useful in the promotion and control of water transport in fallow, as well as cultivated, land. Fallow land is land which is put aside in order to allow the accumulation of water for the following crop year, this procedure being extensively used in arid lands. While the method of the present invention used in connection with fallow land does promote water transport, its main advantage in connection with fallow land is not the promotion of water transport, but rather the control of water transport, and more particularly, the reduction of water loss due to unproductive evaporation from the soil surface. While the control of evaporation (that is, the control of water transport upwardly from the soil surface) plays a major role in the improvement of fallow land by treatment according to the method of the present invention, it plays only a minor role in the improvement of cultivated soil by treatment according to the method of the present invention (as shown by greenhouse experiments wherein any moisture loss due to evaporation may be closely controlled and minimized).

It is theorized and believed that the water transport control (that is, evaporation control) feature of the present invention is closely related to the water transport promotion feature of the present invention as both features display similar and generally substantially coincident peaks in the "less is better" region of polymer application levels.

To summarize, the present invention provides a method of promoting and controlling the transport of water through medium and coarse grained soils by the use of economical quantities of a soil amendment which, if desired, may be selected to have a low wash-out rate from the soil, thereby rendering the composition even more cost effective. The method enables the water demand of the growing crops to be met more efficiently by nearby soil water supplies or, when these are unavailable, by even more distant soil-water supplies.

Now that the preferred embodiments of the present invention have been described, various modifications and improvements thereon will become readily apparent to those skilled in the art. Accordingly, the spirit and scope of the present invention is to be limited by the appended claims, and not by the foregoing disclosure.

We claim:

1. A method of promoting and controlling the transport of water through medium and coarse grained soils comprising the step of applying to medium or coarse grained soil a soil amendment composition at a level of at least 0.05 but less than 20 parts per million parts by weight of dry soil, said composition comprising a substantially linear, substantially water-soluble hydrophilic polymer of ethylene oxide having a molecular weight greater than 50,000, said polymer having one or more functional groups disposed along the polymer chain, said polymer chain comprising one or more segments characterized by an absence of said functional group therein and a minimum length, said minimum length of the polymer chain segment being at least 0.1 micrometer when said polymer chain segment is secured to none of said functional groups at either end thereof or to one of said functional groups only at one end thereof and at least 0.2 micrometer when said polymer chain segment is secured to a respective one of said functional groups at each end thereof, said functional group or groups being more capable of attaching said polymer to a solid soil phase than is said polymer chain segment and said polymer chain segment being adapted to extend into an aqueous soil phase.

2. The method of claim 1 wherein said polymer is selected from the group consisting of substituted homopolymers of ethylene oxide and copolymers of ethylene oxide with minor amounts of one or more substituted comonomers.

3. The method of claim 2 wherein said polymer is substituted poly (ethylene oxide).

4. The method of claims 1, 2 or 3 wherein said polymer has a molecular weight of 300,000 to 7,000,000.

5. The method of claims 1, 2 or 3 wherein said polymer is applied to said soil at a level of at least 5 ppm.

6. The method of claim 1 wherein said polymer has a molecular weight of 300,000 to 7,000,000 and is applied to said soil at a level of at least 5 ppm.

7. A method of promoting and controlling the transport of water through medium and coarse grained soils comprising the step of applying to medium or coarse grained soil a soil amendment composition comprising a substantially linear, substantially water-soluble hydrophilic polymer of ethylene oxide having a molecular weight greater than 50,000, said composition when applied to said soil at various levels of at least 0.05 but less than 20 parts per million parts of dry soil displaying a well defined peak efficiency at a given level, said composition being applied to said soil at or about said given level, and said polymer having one or more functional groups disposed along the polymer chain, said polymer chain comprising one or more segments characterized by an absence of said functional group therein and a minimum length, said minimum length of the polymer chain segment being at least 0.1 micrometer when said polymer chain segment is secured to none of said functional groups at either end thereof or to one of said functional groups only at one end thereof and at least 0.2 micrometer when said polymer chain segment is secured to a respective one of said functional groups at each end thereof, said functional group or groups being more capable of attaching said polymer to a solid soil phase than is said polymer chain segment and said polymer chain segment being adapted to extend into an aqueous soil phase.

8. The method of claim 7 wherein said polymer is selected from the group consisting of substituted homopolymers of ethylene oxide and copolymers of ethylene oxide with minor amounts of one or more substituted comonomers.

9. The method of claim 7 wherein said polymer is substituted poly (ethylene oxide).

10. The method of claims 7, 8, or 9 wherein said polymer has a molecular weight of 300,000 to 7,000,000.

11. The method of claims 7, 8 or 9 wherein said polymer is applied to said soil at a level of at least 5 ppm.

12. The method of claim 7 wherein said polymer has a molecular weight of 300,000 to 7,000,000 and is applied to said soil at a level of at least 5 ppm.

13. The method of claim 7 wherein said polymer is applied at a level at or slightly below said peak.

14. The method of claim 7 wherein, prior to said application step, said composition is applied to soil of the same general type as said soil at various levels of at least 0.05 but less than 20 parts per million parts of dry soil to determine the given level displaying a well defined peak efficiency.

15. The method of claim 7 wherein said peak efficiency is determined by percent increase in yield, relative to a control.

16. The method of claim 7 wherein said peak efficiency is determined by percent increase in yield per unit of polymer applied.

* * * * *